United States Patent [19]

Chang

[11] Patent Number: 4,547,478

[45] Date of Patent: Oct. 15, 1985

[54] CATALYST SYSTEMS FOR POLYURETHANE COMPOSITIONS

[75] Inventor: Eugene Y. C. Chang, Bridgewater, N.J.

[73] Assignee: American Cyanamid Company, Stamford, Conn.

[21] Appl. No.: 588,015

[22] Filed: Mar. 9, 1984

[51] Int. Cl.[4] .................. B01J 31/04; B01J 31/12
[52] U.S. Cl. ....................... 502/154; 502/155; 502/167; 502/170; 521/51; 521/126; 521/127
[58] Field of Search ............... 502/154, 167, 170, 155

[56] References Cited

U.S. PATENT DOCUMENTS

| | | | |
|---|---|---|---|
| 3,506,598 | 4/1970 | Groff et al. | 502/170 X |
| 4,150,206 | 4/1979 | Jourquin et al. | 521/51 |
| 4,293,658 | 10/1981 | Raden et al. | 502/167 X |

*Primary Examiner*—Patrick P. Garvin
*Attorney, Agent, or Firm*—Gordon L. Hart

[57] ABSTRACT

A catalyst composition is disclosed for polyurethane production by reaction between aliphatic hydroxyl-containing compounds and secondary or tertiary aliphatic isocyanate group-containing compounds, comprising (i) 1,8-diazabicyclo(5.4.0)-undecene-7, or a salt thereof; (ii) an organic tin compound and, optionally, (iii) an organic lead compound.

5 Claims, No Drawings

CATALYST SYSTEMS FOR POLYURETHANE COMPOSITIONS

The present invention generally relates to preparation of polyurethanes from hindered aliphatic isocyanates, and particularly to improvements in catalysis of the reaction between hindered aliphatic isocyanates and hydroxyl-containing compounds. More specifically, the invention relates to novel synergistic catalyst compositions for the formation of polyurethanes by reaction between hydroxy-containing compounds and secondary and/or tertiary aliphatic diisocyanates.

BACKGROUND OF THE INVENTION

The term "aliphatic isocyanate" refers to compounds in which the isocyanate group (—NCO) is attached to a carbon atom not in an aromatic ring, and hindered isocyanates are those in which the carbon atom to which the isocyanate group is attached is provided with at least one other inert substituent, generally a lower ($C_1$–$C_8$) alkyl group. The preparation of polyurethanes from aliphatic isocyanates is well-known and the advantages derived therefrom are appreciated by those skilled in the art. Primary aliphatic isocyanates, for example, 1,6-hexamethylene diisocyanate, react significantly faster with compounds containing amino, carboxyl and hydroxyl groups than secondary or tertiary isocyanates. However, many isocyanates containing secondary and/or tertiary isocyanate groups are known and some of them provide highly useful polyurethane products. Unfortunately, they usually are exceedingly slow reacting and require catalysis, especially in reactions with hydroxyl-containing compounds.

Reaction injection molding, commonly referred to by the acronym RIM, is a relatively recent advance in polyurethane technology. The process requires fast polyurethane reactions, that is, on the order of seconds at temperatures in the range of about 25°–40° C. Commonly used polyurethane catalysts, such as lead naphthenate and dialkyl tin dicarboxylates, are not adequate to promote the reaction between hindered aliphatic isocyanates and hydroxyl-containing compounds under these conditions.

Jourquin and DuPrez, U.S. Pat. No. 4,150,206 (common disclosure to German OL No. 2,710,901) describe catalyst mixtures for making polyurethanes. Such mixtures, which comprise, typically, an amine compound of the partial formula

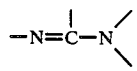

and a lead compound, and, optionally, a tin compound, function to start the reaction quickly, open foamed cells at the end of the reaction, and produce polyurethanes with improved resistance to the development of color under artificial light.

Among the compounds exemplified in the '206 patent are those of the general formulae:

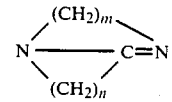

wherein m is from 3 to 7 and n is from 2 to 4. Also exemplified is the compound 1,8-diazabicyclo(5.4.0)-undecene-7, a compound of the above formula, but one in which m is 3 and n is 5. This compound, and its salt with phenol, is shown in the '206 patent to be useful in catalyst systems only in combination with sodium acetate or sodium octoate, but not with tin compounds, alone, or even combined with lead compounds.

SUMMARY OF THE INVENTION

It has now been discovered that a superior catalyst for polyurethane compositions comprises a combination of (i) 1,8-diazabicyclo(5.4.0)-undecene-7, or its phenolate salt, (ii) a tin catalyst, e.g., a dialkyl tin carboxylate, such as dimethyl tin diacetate, or COTIN-222, an organotin carboxylate; and, optionally, but preferably, a lead compound, e.g., an organic lead compound, such as lead naphthenate. Such compositions provide rapid curing, unexpectedly so in view of their superiority over lead/tin combinations in this respect. This permits the usage of lead to be reduced, or even eliminated, maintaining the same order of activity, and avoiding toxicity problems.

In addition, the extremely fast rates realized with the present catalyst composition permit utility in certain, previously foreclosed uses for the tetramethyl-m-xylylenediisocyanate-polyol system, such as RIM and certain coating applications.

In one of its principal aspects, the present invention provides a curable composition comprising:
(a) a polyol compound;
(b) a compound containing hindered aliphatic secondary or tertiary isocyanate groups; and
(c) a catalytically effective amount of a catalyst composition comprising
(i) 1,8-diazabicyclo(5.4.0)-undecene-7 or a phenolate salt thereof;
(ii) an organic tin compound; and, optionally,
(iii) an organic lead compound, the weight ratios of (i):(ii):(iii) being in the range, respectively of from about 0.5:1:0 to about 2:1:3.

In another principal aspect, the present invention provides a process for the catalysis of reaction between aliphatic hydroxyl-containing compounds and hindered aliphatic secondary and/or tertiary isocyanate compounds in a reaction mixture thereof, comprising incorporating in said reaction mixture from about 0.05 to about 5 percent by weight of the catalyst composition defined above.

In another embodiment, the present invention provides a method for producing a non-yellowing, integral skin type foam by reacting:
(1) 50 to 100 parts by weight of a polymer polyol and 0 to 50 parts by weight of a polyether polyol;
(2) a polyisocyanate compound, or prepolymer with a polyether polyol, in which the NCO group is not directly bonded to an aromatic ring;
(3) a crosslinker selected from an amino-alcohol, an alkylene glycol or an aliphatic polyol;
(4) as catalyst, an effective amount of a catalyst composition as above defined;

(5) a foaming agent, e.g., a low-bonding halogenated hydrocarbon; and (6) a light stabilizer.

DETAILED DESCRIPTION OF THE INVENTION

The catalyst compositions of the present invention are suitably employed with aliphatic secondary and/or tertiary diisocyanates which are reacted with primary and/or secondary polyols, as commonly used in the art, to produce polyurethane products, e.g., coatings and injection molded products, according to conventional polyurethane technology. Such commonly used polyols include, for example, ethylene glycol, 1,2-propanediol, 1,3-propanediol, 1,4-butanediol, 1,6-hexanediol, glycerol, trimethylolpropane, p,p'-bis(hydroxyethoxy)benzene, and the like; low molecular weight (mol. wt. 500-5000) polymers or oligomers, such as hydroxyl-terminated polyether polyols, for example, polytetramethylene ether glycol, polyethylene glycol, polypropylene glycol, and propylene glycol/ethylene glycol block copolymers; and hydroxyl-terminated polyester polyols such as, polyethyleneadipate, poly(ethylene-propylene)adipate, and hydroxyl-terminated polyurethane prepolymers prepared therefrom.

In the non-yellowing foams, the polyether polyols which are used are polyether polyols which possess two OH groups, which have been obtained by addition polymerizing one type, or two types or more selected from ethylene oxide, propylene oxide, and butylene oxide with water, or diols such as ethylene glycol, diethylene glycol, triethylene glycol, propylene glycol, dipropylene glycol, butanediol, and hexanediol; and polyether polyols which possess 3 to 8 OH groups, which are obtained by addition polymerizing one type, or two types or more, selected from ethylene oxide, propylene oxide, and butylene oxide with a polyhydric alcohol such as glycerin, trimethylolpropane, hexanetriol, pentaerythritol, α-methyl glucoside, sorbitol, and sucrose. A favorable range of the OH value of the polyether polyol which possesses two OH groups and the polyether polyol which possesses 3 to 8 OH groups is 20 to 60. These types of polyether polyols are used alone, or mixed.

The polymer polyol which is used in the foams is produced by polymerizing a vinyl monomer by a known method in the aforementioned polyether polyol. Monomers selected from vinyl monomers which are highly suitable for this use are one or more of, for example acrylonitrile, styrene, α-methylstyrene, and methyl methacrylate. A highly desirable range of monomer quantity is 10 to 30 parts relative to 100 weight parts of polyether polyol.

In this aspect, the polyether polyol and polymer polyol can be mixed and used as a mixed polyol. An especially favorable mixing range is polymer polyol 50 to 100 parts and polyether polyol 50 to 0 parts by weight of the polyol mixture.

The polymeric polyols can be used in combination with polyols or aminoalcohols. These can serve as crosslinkers. Illustrative amino alcohols which are used as the crosslinking agent which are favorable for this invention are monoethanolamine, diethanolamine, and triethanolamine, and these are used alone or mixed. Special mention is made of N,N,N',N'-tetrakis(2-hydroxypropyl)ethylenediamine.

Also, compounds among low molecular weight polyols which are used as the crosslinking agent are, e.g., ethylene oxide adducts of 3 to 6 hydric alcohols. Other suitable alcohols are glycerol, trimethyolpropane, 1,3,6-hexanetriol, pentaerythritol, and sorbitol. A special mention is made of trimethylolpropane.

If used, the crosslinker is preferably present in an amount to provide from about 5 to about 25 parts by weight per 100 parts by weight of polyol.

With respect to the hindered isocyanates, Stallmann, U.S. Pat. No. 2,723,265, described the preparation of a broad range of hindered isocyanates represented by the formula:

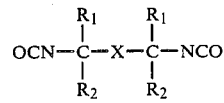

wherein $R_1$ and $R_2$ represent lower alkyl ($C_1-C_8$) groups and X represents a bridging unit.

A process for the preparation of compounds containing secondary and tertiary isocyanates is disclosed by Hoover, U.S. Pat. No. 3,290,350. In the process disclosed in this patent, isocyanic acid is added to a compound containing at least one reactive vinylidine group, of the formula:

wherein $R_1$ is selected from the group consisting of hydrogen and hydrocarbyl ($C_1-C_{12}$) groups and $R_2$ is hydrogen, hydrocarbyl ($C_1-C_{12}$) or substituted hydrocarbyl, wherein the substituents are inert to isocyanic acid and are bonded to a carbon atom at least 2 carbon atoms removed from the ethylenic linkage, or $R_1$ and $R_2$ are conjointly hydrocarbylene of 2-12 carbon atoms. Isocyanates prepared according to this process contain the group:

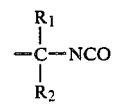

A particularly useful class of isocyanates prepared according to the process of the Hoover patent are those derived from compounds having more than one vinylidine group, the product isocyanates being represented by the formula:

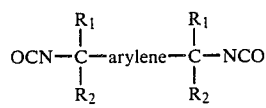

wherein $R_1$ is hydrogen or $C_1-C_4$ alkyl and $R_2$ is hydrogen or $C_1-C_4$ alkyl.

A wide range of both secondary and/or tertiary isocyanates and diisocyanates may be prepared in accordance with the aforementioned prior art, the reaction of which with hydroxyl-containing compounds may usefully be catalyzed by the catalyst compositions of the present invention. Such isocyanates and diisocyanates may for example include, but are not limited to, the following compounds:

α,α'-dimethyl-p-xylylene diisocyanate,
α,α,α',α'-tetramethyl-m-xylylene diisocyanate,
α,α,α',α'-tetramethyl-p-xylylene diisocyanate,
α-methyl-α,α'-dimethyl-m-xylylene diisocyanate,
bis(4-(1-isocyanato-1-methyl-ethyl)phenyl)methane,
α-ethyl-α'-methyl-p-xylylene diisocyanate,
2,6-bis(1-isocyanato-1-methylethyl) naphthalene,
1,4-bis(1-isocyanato-1-methyl-ethyl) cyclohexane,
1,3-bis(1-isocyanato-1-methylethyl) cyclohexane,
1,8-diisocyanato-p-menthane, isophorone diisocyanate, and the like. Special mention is made of α,α,α',α'-tetramethyl-m-xylylene diisocyanate.

Illustrative of preferred polyisocyanate compounds for use in the foamed embodiments of the invention are:

Ethylene diisocyanate, propylene diisocyanate, 2,2,4-trimethylhexamethylene diisocyanate, hexamethylene diisocyanate (HDI), cyclohexylene-1,2-diisocyanate, 3-isocyanate methyl-3,5,5-trimethylcyclohexyl isocyanate (IPDI), m- and p- xylylene diisocyanate (XDI), m- and p-tetramethylxylylene diisocyanate (TMXDI), 4,4'-methylene-bis(cyclohexylisocyanate) (HMDI), 1-methyl-2,4-cyclohexylene diisocyanate (2,4-HTDI), 1-methyl-2,6-cyclohexylene diisocyanate (2,6-HTDI), and 1,3-bis(isocyanate methyl) cyclohexane (HXDI).

As regards the quantity of use of the polyisocyanate or isocyanate-group-terminated prepolymer in the composition of this invention, 0.9 to 1.2 times the equivalent which is preferred in order to react with the polyol and the crosslinking agent, if present.

As to the isocyanate-group-prepolymers, the polyether polyols, having e.g., 3 to 8 OH groups are added to these polyisocyanates and reaction is conducted at 80° to 100° C. for 1 to 2 hours in nitrogen stream, to obtain an isocyanate-group-terminated prepolymer. Calculated quantities which are necessary in order to obtain the prescribed NCO group content in the prepolymer are used.

The compounds, 1,8-diazabicyclo(5.4.0)-undecene-7 (POLYCAT DBU), and its phenolic salt (POLYCAT SA-1), and its 2-ethylhexanoate salt (POLYCAT SA-102), are available from San-Abbott Company, Abbott Laboratories, North Chicago, Ill. 60064.

With respect to the organic tin compound, it is suitable to use tin acetate, tin octanoate, tin oleate, tin laurate, and the like.

It is preferred to use dialkyl tin dicarboxylates, represented by the structure:

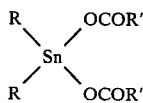

wherein R represents an alkyl group containing from 1 to 8 carbon atoms, and R' represents an alkyl group containing from 1 to 18 carbon atoms, these are well-known catalyst compounds per se. Suitable dialkyl tin dicarboxylates are dimethyl tin dilaurate, dibutyl tin dilaurate, dibutyl tin diacetate, and the like. Special mention is made of UL-28, which is dimethyl tin diacetate, and COTIN-222, which is an organotin carboxylate.

With respect to the organic lead compound, any of the organic lead compounds known in the art for this purpose will be suitable, but most commonly they will comprise a divalent lead organic salt of a carboxylic acid containing at least a COOH group, such as lead acetate, adipate, citrate, 2-ethylhexoate, laurate, linoleate, naphthenate, octanoate, oleate, oxalate, palmitate, resinate, ricinoleate, salicylate, stearate, tallate and tartrate. Special mention is made of lead naphthenate.

Since the reactivity of a non-aromatic polyisocyanate system in which the NCO groups are not directly bonded to the aromatic ring is low, it is necessary to mix components (i), (ii) and, optionally, (iii) to make the best products. An appropriate mixing ratio, as set out above is 0.5 to 2 parts by weight of amine component (i): 0.5 to 1 parts by weight of tin component (ii); and 0 to 3 parts by weight of optional lead component (iii).

As has also been mentioned, from 0.05 to 6, preferably from 0.05 to about 5 parts, and especially preferably, from about 2 to about 5 parts by weight of catalyst composition is used, based on 100 parts by weight of the polyol component (i) in the composition.

With special reference to the foamed embodiments of this invention, typical low-boiling-point halogenated hydrocarbons which are used as foaming agents are, for example, trichlorofluoromethane and methylene chloride.

As a light resistant stabilizer, there can be used one or more types selected from oxidation preventives, ultraviolet ray stabilizers.

As oxidation preventatives, there can be used hindered phenols, for example, Irganox 1010 and Irganox 1076 (made by the Ciba-Geigy Company), and Yoshinox BHT, Yoshinox BB, and Yoshinox GSY-930 (made by Yoshitomi Pharmaceutical Industries, Ltd.)

As ultraviolet ray absorbing agents, there can be used, e.g., benzotriazoles, such as Tinuvin P, Tinuvin 327, and Tinuvin 328 (made by the Ciba-Geigy Company, and benzophenones such as Tomisorb 800 (made by Yoshitomi Seiyaku).

Also, as ultraviolet ray stabilizing agents, for example hindered amines such as Thanol LS770, LS744, and Tinuvin 144 (made by the Ciba-Geigy Company), and Tinuvin 120 and Irgastab 2002 (made by the Ciba-Geigy Company).

As the quality of use of the foregoing light resistant stabilizers, 0.2 to 2.0 parts of each relative to 100 parts of the polyol is appropriate.

When coloring the integral skin foam, a pigment or dye can be added to the mixed polyol and it is colored to the desired color.

It is also possible to add other additives such as fillers and plasticizers.

When using this aspect of the invention, a resin solution is obtained by thoroughly agitating and mixing the mixed polyol, crosslinking agent, catalyst, foaming agent, and light resistant stabilizer, and as necessary other additives.

After next adding the polyisocyanate or isocyanate-group-terminated prepolymer to the resin solution and thoroughly mixing, this is immediately poured into the mold.

When conducting this continuously, a foaming machine is used, and either the resin solution components and polyisocyanate or prepolymer components are poured into the mold at low pressure or if RIM molding is used the substances are injected into the mold under high pressure. After letting this stand for 1 to 5 minutes within the mold, the molded integral skin foam is removed. When the process of this aspect is used, it is possible to mold an integral skin form in a short while and, furthermore, not only does the product possess adequate strength and load-supporting capability but discoloration due to ultraviolet rays does not develop. It is therefore possible to obtain lightly colored cushions, armrests, pads, etc., easily and in a single process.

DESCRIPTION OF THE PREFERRED EMBODIMENTS

The following non-limiting examples illustrate the invention. All parts and percentages are by weight, unless otherwise indicated.

EXAMPLES 1-7

A prepolymer was made by mixing 410 parts of a polymer polyol (NIAX ®LHT-42, Union Carbide, e.g. wt. 1420) with 1000 parts of $\alpha,\alpha,\alpha',\alpha'$-tetramethyl-m-xylylenediisocyanate and 0.14 parts of tin catalyst dibutyltindilaurate, T-12, M & T Chemical Co. and heating at 85° C. for 4 hours. The NCO content was 23%. Then 15 parts of the prepolymer was mixed with 25 parts of a mixture of 100 parts of a polypropylene polyol (VORANOL ® 5148, equivalent wt. 2340, Dow Chemical), and 16 parts of trimethylol propane. The catalyst components were thoroughly mixed in at the temperature specified for 0.3' (0.3 minutes=20 seconds). The mixture was allowed to exotherm and gel. Gel time was reached when the mixture stopped flowing, and hard-time was reached when the composition became tack-free. For comparison purposes, catalyst compositions outside the scope of the present invention were also tested. The formulations used and the results obtained are set forth in Table 1:

TABLE 1

| Polyurethane Compositions Cured with Catalyst | | | | | | | | | | | | | |
|---|---|---|---|---|---|---|---|---|---|---|---|---|---|
| Compositon (parts) | 1A* | 1B* | 1C* | 1D* | 1E* | 1F | 1 | 2 | 3 | 4 | 5 | 6 | 7 |
| Polyproylene polyol (in mixture) | 100 | 100 | 100 | 100 | 100 | 100 | 100 | 100 | 100 | 100 | 100 | 100 | 100 |
| Lead naphthenate | — | — | — | — | — | 2.8 | — | — | — | — | — | — | — |
| Tin Catalyst (UL-28) | 4.65 | — | — | — | 2.33 | 1.8 | 2.33 | 3.5 | 1.78 | 1.4 | 0.93 | — | — |
| Tin Catalyst (T-12) | — | — | 4.65 | — | — | — | — | — | — | — | — | — | — |
| Tin Catalyst (COTIN-222) | — | 4.65 | — | — | — | — | — | — | — | — | — | 2.33 | 1.4 |
| 1,8-Diazabicyclo (5.4.0)-undecene-7 | — | — | — | 4.65 | — | — | 2.33 | 1.16 | 2.8 | 3.26 | 3.55 | 2.33 | 3.26 |
| Triethylenediamine | — | — | — | — | 2.33 | — | — | — | — | — | — | — | — |
| Properties | | | | | | | | | | | | | |
| Mixing temp., °C. | 27 | 27 | 27 | 27 | 27 | 27 | 27 | 27 | 27 | 27 | 27 | 27 | 27 |
| Gel time, min. | 2 | 1.4 | 3.2 | 0.9 | 2.3 | 1.2 | 0.5 | 1.25 | 0.6 | 0.42 | 0.46 | 0.55 | 0.45 |
| Hardening time, min. | 2.8 | 1.9 | 4.7 | 1.6 | 3.8 | 1.6 | 0.7 | 1.6 | 0.72 | 0.65 | 0.70 | 0.75 | 0.65 |
| Remarks | — | — | — | opaque | clear | clear | opaque | opaque | opaque | opaque | opaque | opaque | opaque |

*Control

The results in Table 1 indicate that polyoltrimethylol propane-tetramethylxylylene diisocyanate compositions were only slowly catalyzed by the DBU and its salts and by some tin compounds when used by themselves. But in combination, they were faster than lead/tin combinations (which are state-of-the-art). A conventional polyamine was not as effective as the DBU and its salts. Both tin catalysts were about equally active in combination with the DBU and salts, and the best ratio of DBU compound to tin compound appeared to be about 2:1 by wt.

EXAMPLES 8-14

The general procedure of Examples 1-7 was repeated, using different ratios in the catalyst combination, and substituting for the cyclic diamine, in some instances, acid addition salts thereof. The formulations used and the results obtained are summarized in Table 2:

TABLE 2

| Polyurethane Compositions Catalyzed with Cyclic Diamines | | | | | | | | |
|---|---|---|---|---|---|---|---|---|
| Composition (parts) | Example | | | | | | | |
| | 8A* | 8 | 9 | 10 | 11 | 12 | 13 | 14 |
| Polypropylene polyol in mixture | 100 | 100 | 100 | 100 | 100 | 100 | 100 | 100 |
| Lead napthenate | 4 | 3 | 2 | — | 2 | 1 | 1 | 1 |
| Tin Compound (UL-28) | 1 | 1 | 1 | 1 | — | 1 | 1 | 1 |
| Tin Compound (COTIN 22) | — | — | — | — | 1 | — | — | — |
| 1,8-Diazabicyclo (5.4.0) undecene-7 | — | 1 | 1 | 1 | 1 | 1 | — | — |
| 1,8-Diazabicyclo (5.4.0) undecene-7, phenolate salt | — | — | — | — | — | — | 1 | — |
| 1,8-Diazabicyclo (5.4.0) undecene-7, 2-ethyl hexanoate salt (POLYCAT SA-102) | — | — | — | — | — | — | — | 1 |
| Properties | | | | | | | | |
| Mixing temp. °C. | 22.5 | 22.5 | 22.5 | 22.5 | 22.5 | 22.5 | 22.5 | 22.5 |
| Gel time, min. | 1.05 | 0.45 | 0.45 | 1.05 | 0.5 | 0.5 | 0.65 | 2.0 |
| Hand time, min. | 1.6 | 0.85 | 0.85 | 1.4 | 1.3 | 0.85 | 0.95 | 3.0 |

*Control

The results in Table 2 show that the cyclic diamine significantly enhanced the activity of the lead/tin combination. It also shows that the usage of lead can be reduced to maintain the same level of activity. The phenolic salt of the cyclic diamine was almost as effective as the free base.

EXAMPLES 15-18

The general procedure of Examples 1-7 is used to formulate and test polyol mixtures with diisocyanates catalyzed according to this invention. The polymer polyol was NIAX ® D 440, e.g. wt. 2050, Union Carbide.

The formulations used and the results obtained are set forth in Table 3.

TABLE 3
Polyurethanes Catalyzed with Cyclic Diamines

| Composition (parts)** | 15A* | 15 | 16 | 17A* | 17 | 18 |
|---|---|---|---|---|---|---|
| Polymer polyol | 100 | 100 | 100 | 100 | 100 | 100 |
| Trimethylopropane | 12 | 12 | 12 | — | — | — |
| N,N,N',N'—tetrakis-(2-hydroxypropyl)-ethylene diamine | — | — | — | 25 | 25 | 25 |
| α, α, α', α'-tetramethyl-m-xylylene diisocyanate (m-TMXDI) | 40 | 40 | 40 | 40 | 40 | 40 |
| Lead naphthenate | 3 | — | 1 | 3 | — | 2 |
| Tin catalyst (UL-28) | 1 | 1 | 1 | 1 | 1 | 1 |
| 1,8-Diazabicyclo (5.4.0)-undecene-7 | — | 3 | 2 | — | 3 | 1 |
| Properties | | | | | | |
| Mixing Temp., °C. | 25 | 25 | 25 | 25 | 25 | 25 |
| Gel time, min. | 0.8 | 0.4 | 0.3 | 0.75 | 1.7 | 0.3 |
| Hardening time, min. | 0.95 | 0.55 | 0.48 | 0.95 | 1.9 | 0.4 |

*Control
**Polyol mix 28 g./m-TMXDI 10 g (15A*-16)
Polyol mix 30 g./m-TMXDI 12 g (17A*-18)

Table 3 shows that the cyclic diamine-containing compositions effectively promote the reaction of mixtures containing a polymer polyol. Best results were obtained with ternary catalyst compositions (including lead).

EXAMPLES 19-20

The general procedure of Examples 1-7 was repeated using strong amine-carrying cross-linkers instead of alkyl polyols. The isocyanate-containing prepolymer was as in Example 1. The formulations used and the results obtained are set forth in Table 4.

TABLE 4
Polyurethane Compositions Cured with Cyclic Diamines

| Composition (parts) | 19A* | 19B* | 19 | 20A* | 20B* | 20 |
|---|---|---|---|---|---|---|
| polypropylene polyol (e.g. wt. 2000, VARANOL 10815) | 100 | 100 | 100 | 100 | 100 | 100 |
| Triethanolamine | 35 | 35 | 35 | — | — | — |
| Tetrol (PPG AE-302, e.g. wt. 74) | — | — | — | 40 | 40 | 40 |
| Prepolymer with NCO- groups | 140 | 140 | 140 | 110 | 110 | 110 |
| Lead naphthenate | 5.5 | 4.4 | 2.2 | 5.5 | 4.4 | 2.2 |
| Tin Compound (UL-28) | — | 1.1 | 1.1 | — | 1.1 | 1.1 |
| 1,8-Diazabicyclo(5.4.0)-undecene-7 | — | — | 2.2 | — | — | 2.2 |
| Properties | | | | | | |
| Mixing temp., °C. | 20 | 20 | 20 | 20 | 20 | 20 |
| Gel-time, min. | 0.3 | 0.35 | 0.35 | 0.25 | 0.45 | 0.35 |
| Hardening time, min. | 0.35 | 0.42 | .50 | 0.45 | 0.80 | 0.65 |

*Control

In the presence of strong amine-carrying crosslinkers, lead gave the fastest rate, but the dicyclic diamine permitted the level of lead needed to be reduced substantially.

All of the above-mentioned patents and publications are incorporated herein by reference. Obviously, many variations will suggest themselves to those skilled in this art in light of the above detailed description. For example, there can be used a wide variety of aliphatic isocyanates, e.g., 1,8-diisocyanate-o-menthane, adducts of isocyanates, and prepolymers (all with NCO ends). Likewise, a wide variety of hydroxy compounds can be used, including hydroxyl terminated polyesters or polyethers, simple diols or polyols, such as ethylene glycol, butanediol, glycerol, and the like, and hydroxyl compounds containing other than carbon atoms in the molecule, e.g., N, S, P, Si, etc., and adducts containing active hydrogen atoms. All such obvious variations are within the full intended scope of the appended claims.

What is claimed is:

1. A composition for the catalysis of reaction between an aliphatic hydroxyl-containing compound and a hindered aliphatic secondary or tertiary isocyanate group containing compound, said catalyst composition comprising
    (i) 1,8-diazabicyclo(5.4.0)-undecene-7 or a salt thereof;
    (ii) a dialkyl tin dicarboxylate and, optionally,
    (iii) a divalent lead salt of an organic acid, the weight ratios of (i):(ii):(iii) being in the range, respectively, of from about 0.5:1:0 to about 2:1:3.

2. A composition as defined in claim 1, wherein component (i) is the phenolate salt.

3. A composition as defined in claim 1 wherein said dialkyl tin dicarboxylate is of the formula:

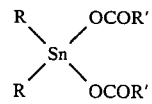

wherein R is $C_1-C_8$ alkyl and R' is $C_1-C_{18}$ alkyl.

4. A composition as defined in claim 3 wherein said dialkyl tin dicarboxylate is selected from dimethyl tin dilaurate and dibutyl tin dilaurate.

5. A composition as defined in claim 1 wherein component (iii) is lead naphthenate.

* * * * *